United States Patent
Parshin et al.

(10) Patent No.: US 8,365,297 B1
(45) Date of Patent: Jan. 29, 2013

(54) SYSTEM AND METHOD FOR DETECTING MALWARE TARGETING THE BOOT PROCESS OF A COMPUTER USING BOOT PROCESS EMULATION

(75) Inventors: Yury G. Parshin, Moscow (RU); Vladislav V. Pintiysky, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/440,442

(22) Filed: Apr. 5, 2012

(30) Foreign Application Priority Data

Dec. 28, 2011 (RU) .................................. 2011153568

(51) Int. Cl.
*H04L 29/14* (2006.01)
*G06F 21/22* (2006.01)

(52) U.S. Cl. .............................................. 726/26; 713/2
(58) Field of Classification Search .................. None
See application file for complete search history.

(56) References Cited

U.S. PATENT DOCUMENTS

| | | | |
|---|---|---|---|
| 5,088,033 A * | 2/1992 | Binkley et al. ................. | 703/24 |
| 6,145,078 A * | 11/2000 | Akamatsu ...................... | 713/2 |
| 6,397,242 B1 | 5/2002 | Devine et al. | |
| 6,496,847 B1 | 12/2002 | Bugnion et al. | |
| 6,510,512 B1 * | 1/2003 | Alexander ...................... | 713/2 |
| 6,718,401 B2 | 4/2004 | Nalawadi et al. | |
| 6,795,966 B1 | 9/2004 | Lim et al. | |
| 6,802,028 B1 | 10/2004 | Ruff et al. | |
| 6,907,524 B1 | 6/2005 | Huntington et al. | |
| 6,907,533 B2 | 6/2005 | Sorkin et al. | |
| 6,981,155 B1 | 12/2005 | Lyle et al. | |
| 7,103,529 B2 | 9/2006 | Zimmer | |
| 7,103,771 B2 | 9/2006 | Grawrock | |
| 7,127,579 B2 | 10/2006 | Zimmer et al. | |
| 7,216,367 B2 | 5/2007 | Szor | |
| 7,325,251 B1 | 1/2008 | Szor | |
| 7,356,844 B2 | 4/2008 | Lyle et al. | |
| 7,424,710 B1 | 9/2008 | Nelson et al. | |

(Continued)

FOREIGN PATENT DOCUMENTS

| WO | WO97/05547 | 2/1997 |
|---|---|---|
| WO | WO2007069245 | 4/2009 |

(Continued)

OTHER PUBLICATIONS

Natvig, "Sandbox Technology Inside AV Scanners", Virus Bulletin Conference. pp. 475-488. Sep. 2001.

(Continued)

*Primary Examiner* — Venkat Perungavoor
(74) *Attorney, Agent, or Firm* — Patterson, Thuente, Christensen, Pedersen P.A.

(57) ABSTRACT

System and method for detecting malware on a target computer system having a bootable device. Boot process information stored on the bootable device that at least partially defines a boot process of the target computer system is obtained, along with physical parameter data defining a storage arrangement structure of the bootable device. The boot process of the target computer system is emulated based on the boot process information and on the physical parameter data. The emulation includes executing instructions of the boot process information and tracking data accessed from the bootable device. A data structure representing the data accessed from the bootable device is stored during the emulation of the boot process. The data structure can be analyzed for any presence of boot process malware.

25 Claims, 10 Drawing Sheets

U.S. PATENT DOCUMENTS

| | | | |
|---|---|---|---|
| 7,607,173 B1 | 10/2009 | Szor et al. |
| 7,631,357 B1 | 12/2009 | Stringham |
| 7,640,543 B2 | 12/2009 | Vij et al. |
| 7,647,308 B2 | 1/2010 | Sallam |
| 7,665,123 B1 | 2/2010 | Szor et al. |
| 7,689,817 B2 | 3/2010 | Zimmer et al. |
| 7,802,300 B1 | 9/2010 | Liu et al. |
| 7,841,006 B2 | 11/2010 | Gassoway |
| 7,845,009 B2 | 11/2010 | Grobman |
| 7,860,850 B2 | 12/2010 | Park |
| 7,861,302 B1 | 12/2010 | Raz et al. |
| 7,921,146 B2 | 4/2011 | Qiao et al. |
| 7,934,261 B1 | 4/2011 | Saguiguit et al. |
| 7,971,952 B2 | 7/2011 | Furuhata |
| 7,975,298 B1 | 7/2011 | Venkatasubrahmanyam |
| 7,996,836 B1 | 8/2011 | McCorkendale et al. |
| 8,001,174 B2 | 8/2011 | Ramiah |
| 8,019,837 B2 | 9/2011 | Kannan et al. |
| 8,032,660 B2 | 10/2011 | Sahita et al. |
| 8,056,136 B1 | 11/2011 | Zaitsev |
| 8,099,596 B1 | 1/2012 | Rusakov et al. |
| 8,108,931 B1 | 1/2012 | Witten et al. |
| 8,131,987 B2 | 3/2012 | Lo et al. |
| 2002/0169987 A1 | 11/2002 | Meushaw et al. |
| 2003/0120856 A1 | 6/2003 | Neiger et al. |
| 2003/0188165 A1 | 10/2003 | Sutton et al. |
| 2004/0010703 A1 | 1/2004 | Kouznetsov et al. |
| 2004/0078636 A1 | 4/2004 | Suzaki |
| 2004/0103417 A1 | 5/2004 | Voellm et al. |
| 2004/0205723 A1 | 10/2004 | Juan et al. |
| 2005/0080753 A1 | 4/2005 | Vega et al. |
| 2005/0081199 A1 | 4/2005 | Traut |
| 2005/0182940 A1 | 8/2005 | Sutton et al. |
| 2005/0193428 A1 | 9/2005 | Ring et al. |
| 2005/0251867 A1 | 11/2005 | Sastry et al. |
| 2006/0005184 A1 | 1/2006 | Tewari et al. |
| 2006/0031673 A1 | 2/2006 | Beck et al. |
| 2006/0095904 A1 | 5/2006 | Gardner et al. |
| 2006/0179484 A1 | 8/2006 | Scrimsher et al. |
| 2006/0294592 A1 | 12/2006 | Polyakov et al. |
| 2007/0006175 A1 | 1/2007 | Durham et al. |
| 2007/0016914 A1 | 1/2007 | Yeap |
| 2007/0079178 A1 | 4/2007 | Gassoway |
| 2007/0088834 A1 | 4/2007 | Litovski et al. |
| 2007/0180529 A1 | 8/2007 | Costea et al. |
| 2007/0240222 A1 | 10/2007 | Tuvell et al. |
| 2008/0005797 A1 | 1/2008 | Field et al. |
| 2008/0201129 A1 | 8/2008 | Natvig |
| 2008/0244114 A1 | 10/2008 | Schluessler et al. |
| 2009/0141028 A1 | 6/2009 | Arora et al. |
| 2009/0172822 A1 | 7/2009 | Sahita et al. |
| 2009/0204964 A1 | 8/2009 | Foley et al. |
| 2009/0245521 A1 | 10/2009 | Vembu et al. |
| 2009/0271841 A1 | 10/2009 | Dow et al. |
| 2009/0300307 A1 | 12/2009 | Carbone et al. |
| 2010/0058431 A1 | 3/2010 | McCorkendale et al. |
| 2010/0132015 A1 | 5/2010 | Lee et al. |
| 2011/0035808 A1 | 2/2011 | Butler et al. |
| 2011/0145806 A1 | 6/2011 | Cook |

FOREIGN PATENT DOCUMENTS

| | | |
|---|---|---|
| WO | WO2011046422 | 4/2011 |

OTHER PUBLICATIONS

Kephart et al., "Blueprint for a Computer Immune System". http://www.research.ibm.com/antivirus/SciPapers/Kephart/VB97. 17 pages. Oct. 1-3, 1997.

* cited by examiner

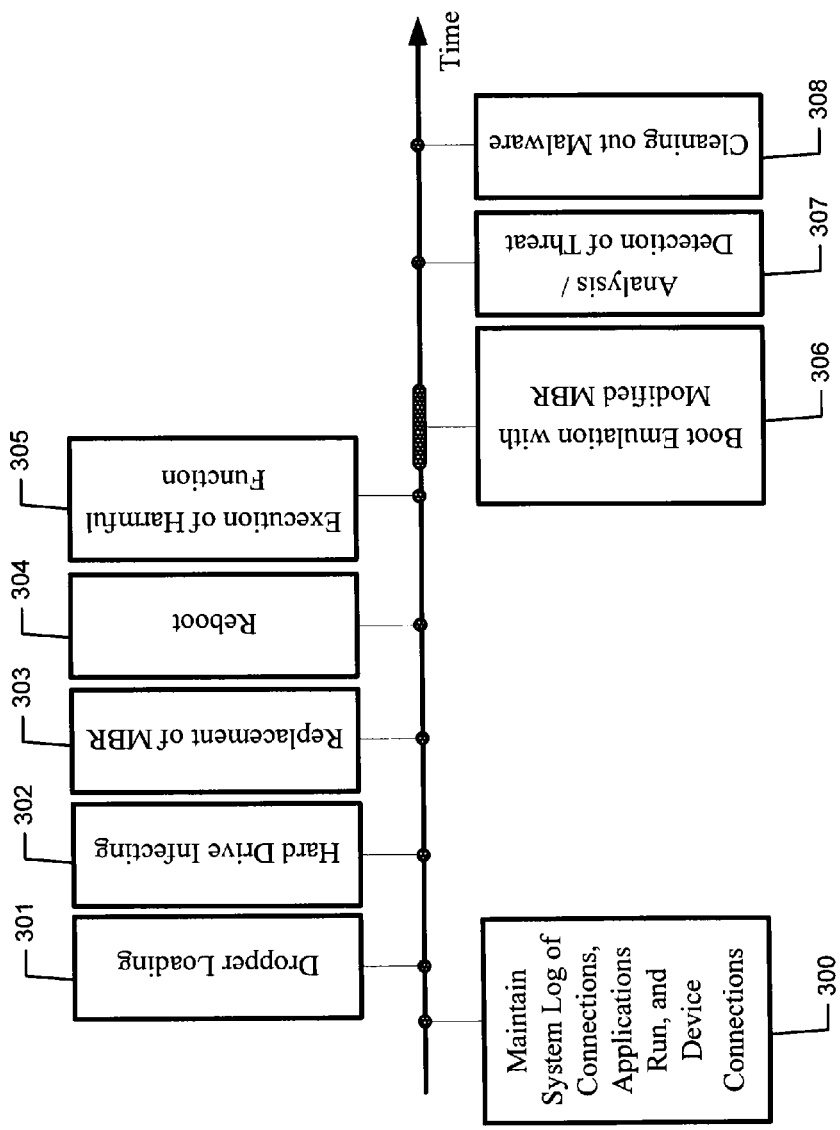

SYSTEM AND METHOD FOR DETECTING MALWARE TARGETING THE BOOT PROCESS OF A COMPUTER USING BOOT PROCESS EMULATION

CLAIM TO PRIORITY

This Application claims priority to Russian Federation Patent Application No. 2011153568 filed Dec. 28, 2011, the disclosure of which is incorporated by reference herein.

FIELD OF THE INVENTION

The invention relates generally to information processing and security and, more particularly, to detecting malicious programs that infect a computer system's boot process.

BACKGROUND OF THE INVENTION

Securing computer systems from attack by malware, i.e., harmful programs such as viruses, trojans, worms, rootkits, and the like, is an evolving challenge as perpetrators of malware constantly develop new technologies. Of particular concern are pieces of malware known as bootkits, which change the computer system boot process. These are among the hardest-to-detect malware for contemporary computer systems. Infiltration in the boot process allows a piece of harmful code to bypass the existing protection features, hide itself and complicate the computer's ability to detect and remove the harmful process.

The computer boot process has a number of steps, which include testing and initialization of hardware, operating system boot and automatic loading of user applications. The earlier in the boot sequence that a harmful can take control, the harder it is to counter the threat. One goal of an anti-malware program is to take control of the boot sequence before it is taken over by a piece of harmful code, which will allow the anti-virus program to monitor and detect abnormalities and suspicious data.

Today, anti-rootkit technologies are known and used for this purpose, examples of which are described in U.S. Patent Applications, Pub. No. 2006/480774 and 2007/873583. These approaches are designed as operating system drivers which modify the operating system boot process, track further boot process activities and, if necessary, block and delete harmful boot programs. These technologies are effective only for threats aiming to infiltrate the operating system and do not allow detection of bootkits loaded before the operating system. Bootkits modify the boot process at the earliest stage by changing the boot record. When combined with rootkit technologies, such programs become unreachable for conventional protection features installed on a computer system.

One approach for combating this type of malware uses external boot technologies, examples of which are disclosed in Publications No. EP1995936668 and WO2007069245. When booting from external devices, the computer's malware is not loaded and can be detected during conventional anti-virus scanning of the file system, hard drive, etc. Drawbacks of this type of approach include the need for specialized external disks or devices, and the need for users to take specific, targeted actions to carry out the evaluation of boot process malware by employing the external boot technology.

At least for the above reasons, a solution is needed that provides practical and automated detection of bootkit-deployed malware.

SUMMARY OF THE INVENTION

One aspect of the invention is directed to emulating the boot process of a computer system. Emulation refers to machine-implemented duplication of the operation of a computer system. Emulation may be performed on the same computer system hardware as the computer system being emulated, or on a different set of computer hardware that is communicatively interfaced with the computer system being protected. Emulation allows evaluation of the boot process, beginning with the moment the computer is switched on, and to detect malware or, more generally, unknown programs which may or may not actually be harmful, on the computer system or network media. Aspects of the present invention allow not only to detect known harmful code (identifiable, for example, by checksums, hashes, or certain features or other signatures), but also to find abnormalities in the boot process (i.e. to detect their harmful nature during boot). Practical application of the invention allows a protection service provider to analyze infected media remotely, without having to use external boot devices. Detection of unknown programs using boot process emulation significantly reduces the time needed to find and analyze unknown programs and unknown disk sectors which modify the boot process.

According to a related embodiment, physical parameter data defining a storage arrangement structure of the bootable device is obtained by an automated protection system of a target computer system, the boot process of the target computer system is emulated based on the physical parameter data. The emulating is carried out in a virtual environment representing the target computer system, and includes executing the boot code and obtaining boot process information in response to executing of the boot code. A data structure is generated representing at least the boot process information. Based on the data structure, a determination of whether the boot process information includes an unknown program is made.

According to another aspect of the invention, a protection system for detecting unknown programs on a target computer system having a boot device is provided. The system includes a boot emulator module configured to collect boot process information stored on the bootable device that at least partially defines a boot process of the target computer system and physical parameter data defining a storage arrangement structure of the bootable device. The boot emulator module is configured to perform an emulation of the boot process of the target computer system based on the boot process information and on the physical parameter data. The boot emulator module is further configured to execute instructions of the boot process information and track data accessed from the bootable device in response to the instructions of the boot process information. A detector module is communicatively coupled with the boot emulator module, and configured to detect a presence of unknown programs based on the data accessed from the bootable device in the emulation of the boot process.

In another aspect of the invention, an automated computer-implemented method for detecting an unknown program on a target computer system having a bootable device is provided. The method includes receiving, by an automated analysis system remotely located from the target computer system, a data structure containing: boot process information stored on the bootable device that at least partially defines a boot process of the target computer system; and physical parameter data defining a storage arrangement structure of the bootable device. The automated analysis system analyzes whether the bootable device contains a suspicious program accessed by the boot process of the target computer system, including emulating the boot process of the target computer system based on the data structure by at least executing code of the boot process information in a virtualized computer system representing physical characteristics of the target computer system, and evaluating a result of the executing of that code.

Aspects of the invention advantageously provide a practical solution for the problems outlined above, as well as addressing a number of other shortcomings of conventional approaches to dealing with bootkits and related malware.

BRIEF DESCRIPTION OF THE DRAWINGS

The invention may be more completely understood in consideration of the following detailed description of various embodiments of the invention in connection with the accompanying drawings, in which:

FIGS. 3A and 3B are flow diagrams illustrating examples of functionality of a program for cleaning an infected disk and to block disk infections through the use of a boot emulation technique according to embodiments of the invention.

Figure 1:
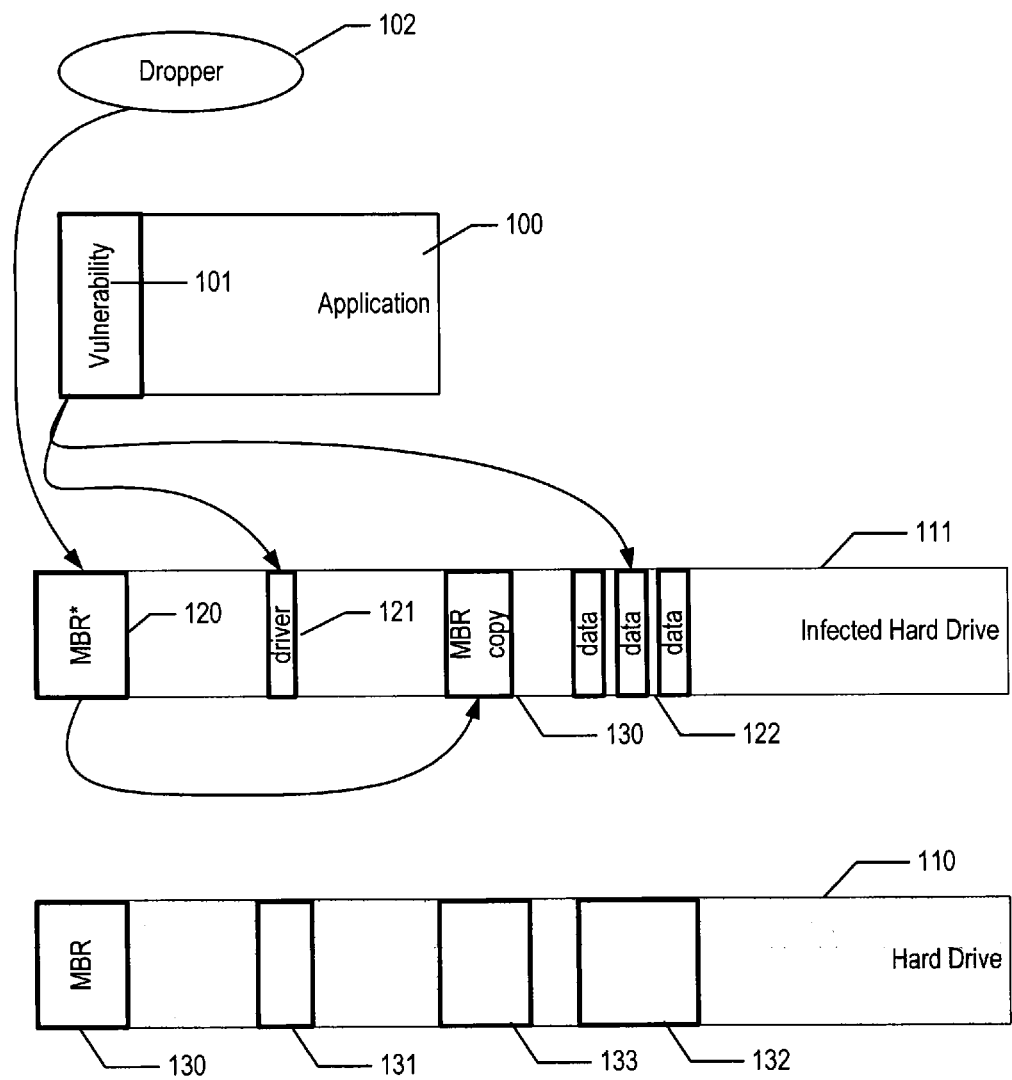
FIG. 1 is a diagram illustrating operation of a piece of malware that is designed to target a computer system's boot process.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The computer boot process is a complex process with several specifics and nuances, which generally can be divided into two stages: the initial boot and the operating system boot. After the computer is switched on, the power supply tests all necessary voltage levels; if all voltage levels correspond to normal ones, the motherboard receives a PowerGood signal. In the initial state, the processor's input receives a RESET signal, which keeps the processor in a reset state. But after the PowerGood signal is received from the power supply, the RESET signal will be removed, and the processor will begin to execute its first instructions. Therefore, after the power test, the processor starts from the following state: the command register CS contains 0xFFFF, the command pointer (IP register) contains 0, the data and stack segment registers contain 0. After RESET is removed, the processor executes the instruction at the 0xFFFF0 address, in real mode, where the ROM BIOS area is located. Its size is 16 bytes, up to the end of the maximum addressable address area in real mode—0xFFFFF. At this address, the instruction for transition to a real-mode executable BIOS code is located. By executing the BIOS code, the computer goes through a POST (Power-On Self Test) diagnostics stage. The processor, the memory, and the input/output resources are tested; also, software-selectable resources of the system board are configured.

After going through the testing and configuration procedure, the computer moves on to the operating system boot process. The BIOS program reads information from the active boot disk (defined by BIOS settings) of the BOOT sector, which, for a floppy disk or a hard drive, is located at the address Cylinder=0, Head=0, Sector=1, into the computer's memory at the physical address 0x7C00. The sector size is 512 bytes. After that, a check is performed to determine whether this sector is a boot sector. This is done by searching for the 0x55AA signature at the end of the sector. If no such sequence is found at the end of the sector, the BIOS sends a message that the boot sector was not found.

A sector is a minimally addressable unit of a hard drive. It is not possible to read less than one sector. On most drives, the sector size is 200 h bytes; newer hard drives have larger sector sizes. The zero sector of a hard drive contains the so-called Master Boot Record (MBR). It occupies the whole sector, i.e. 512 bytes. By this record, the BIOS determines the number of logical drives and determines which system it has to load and from where.

The MBR contains machine code to be executed by the processor, information on four partitions of the disk, and the 0xAA55 signature at the very end. The execution begins with a zero offset of the sector. The MBR structure can be described as follows. The signature is used by the BIOS loader to verify the correctness of the MBR; in case of failure, the computer's operation is suspended. Each partition is also described by a separate structure. The activity indicator byte can be equal to either 0 or 0x80. If it equals 0x80, the partition is considered to be active; the loader reads its first 0x200 bytes and transfers control to it. The "partition type" field describes the formatting of a specific partition and can assume various values.

Generally, no more than four partitions can exist on a hard drive. However, Windows allows to divide the drive into more parts. An extended partition (partition type code 7), in addition to the partition content itself, contains a pointer to the next partition. Consequently, a linked list is formed from extended partitions. Their quantity is limited only by free unformatted space. Therefore, the complete computer boot algorithm is as follows: the code in the MBR verifies the operability of the hard drive, then it searches for a partition with a displayed activity indicator of 0x80, by looking through the partition table, and transfers control to the zeroth byte of the latter.

The MBR code loads information from specified sectors of the disk (which can be one or more programs such as a boot loader to be further executed, or data to be used by those programs). Following execution of the MBR code and of any subsequent boot process programs, control is transferred to the operating system.

The MBR is the most vulnerable area in the protection process, from the security point of view. If it is edited and if the boot code is changed, a harmful component will be loaded in the operating system kernel; this component will be able to exclude any security programs on the computer, including anti-virus programs. Some hackers take advantage of this factor, creating special programs called bootkits.

Bootkits modify the MBR's boot sector, the first physical sector on the hard drive. This type of malware is used to gain maximum privileges in operating systems and for concealment in the system. A bootkit can obtain administrator (superuser) rights and perform a number of harmful actions, making this type of malware one of the most dangerous.

A bootkit's activity begins when the computer is restarted. The restart may be initiated by the malware or by the user. Once the computer is rebooted from the infected boot sector, the bootkit's component which executes the harmful functionality is started.

There are many types of bootkits, distinguished by the complexity of their work flow. Simple bootkits edit the boot record, place data and a code in disk sectors, do not encode data and do not use technologies of self-concealment in the system like rootkit technologies. Others, on the contrary, use various self-protection tools in order to counter the anti-virus check and avoid detection.

A diagram of one of the scenarios of bootkit infection and operation is shown in FIG. 1. If the computer has an application 100 installed, which has a vulnerability 101 known to hackers, it is used to seize control of the execution process in order to write the body of a piece of malware 120, 121, 122 to a disk 110. Infection can occur via hacked web sites. A harmful component is uploaded to the computer; this component, using, for example, vulnerabilities in the installed software, seizes control and modifies the boot record. Infection can be caused using other methods, but the final result is specifically intended to replace the boot sector. The infection can be caused by such harmful components as a dropper 102 or a remotely controlled spy program (e.g. a trojan downloader), which contain a bootkit or upload it from a remote address, respectively. Below is an example of such a disk sector record:

HANDLE hDisk=CreateFileA("\\\\.\\PhysicalDrive0", GENERIC_WRITE|GENERIC_READ, FILE_SHARE_READ|FILE_SHARE_WRITE, NULL, OPEN_EXISTING, 0x0, 0x0);
WriteFile(hDisk, MbrBuffer, sizeof(MbrBuffer), &dwWritten, NULL);

In various embodiments, the bootkit content is written into an unformatted part of the disk, into pseudo-"bad" sectors (i.e. sectors marked as "corrupt" by the file system, without actually being corrupt), placed at the end of the first sector, hidden using rootkit technologies, etc. FIG. 1 shows the areas on the disk 131, 132, 133 where bootkit data can be written. Therefore, bootkit data 121, 122 and a hidden copy of the boot record 130 are not reflected in the operating system's file system, are not included in disk partitions and are not detectable by scanning the files and the disk space, if the anti-virus software does not use tools which are effective against this type of threat. Aspects of the invention recognize that it is possible to build an efficient security system for a computer by analyzing current threats and their harmful functionality; this requires access to the files or data area which store the malware and are used by it. It is especially important to timely gather information on the threat in order to respond to it early; otherwise, infection of a multiplicity of computers can lead to an outbreak and cause significant damage to the public's information systems.

In one example, the bootkit includes a driver 121, which executes rootkit functionality, a modified MBR 120 and a payload of harmful functionality 122. In this case, the bootkit can additionally contain encoding components used to conceal data, anti-detection components, and other additional functions, which complicate the analysis of the malware. The number of the disk sectors used during the system boot process can be dozens or even hundreds, while the disk area occupied by the harmful functionality executed after the operating system boot can be even greater.

When a computer boots from infected disk 111, which has a modified boot sector, the modified MBR 120 loads the disk sectors containing the bootkit code; subsequently, control is transferred and the operating system is loaded together with the rootkit component. This boot sequence allows the bootkit to remain undetected. The original MBR 130 is copied to a specific area on the disk 133 and in some cases may be encoded. The bootkit needs a copy of it in order to pass the boot record integrity test and to substitute the original record when calls are made for the disk's boot sector. As a result, the operating system, conventional anti-virus programs and other security tools conclude that the actually modified MBR 120 is not modified and the disk 111 is not infected. The need to save the original MBR 130 also provides the opportunity to restore of the system. To do this, the protection system determines the original MBR's 130 copied-to address on the disk, decodes it (if necessary) and rewrites it into the boot sector, replacing the modified record 120.

Every bootkit has its own functionality: some are intended to collect confidential information and to send it remotely; others aim to block the computer's operation; others are used to create bot-networks. Depending on the bootkit operation model, the executable code containing a harmful functionality can be written into the memory before or after the operating system boots up. In the former case, in order to trace the disk area containing the executable code, it is sufficient to study the system boot process before the operating system is launched. In the latter case, it becomes necessary to study the operating system's activity and to track the execution process of the functionality in question after the system boot. This operation requires significant computing resources and is of high priority for hardware emulation.

Figure 2A:
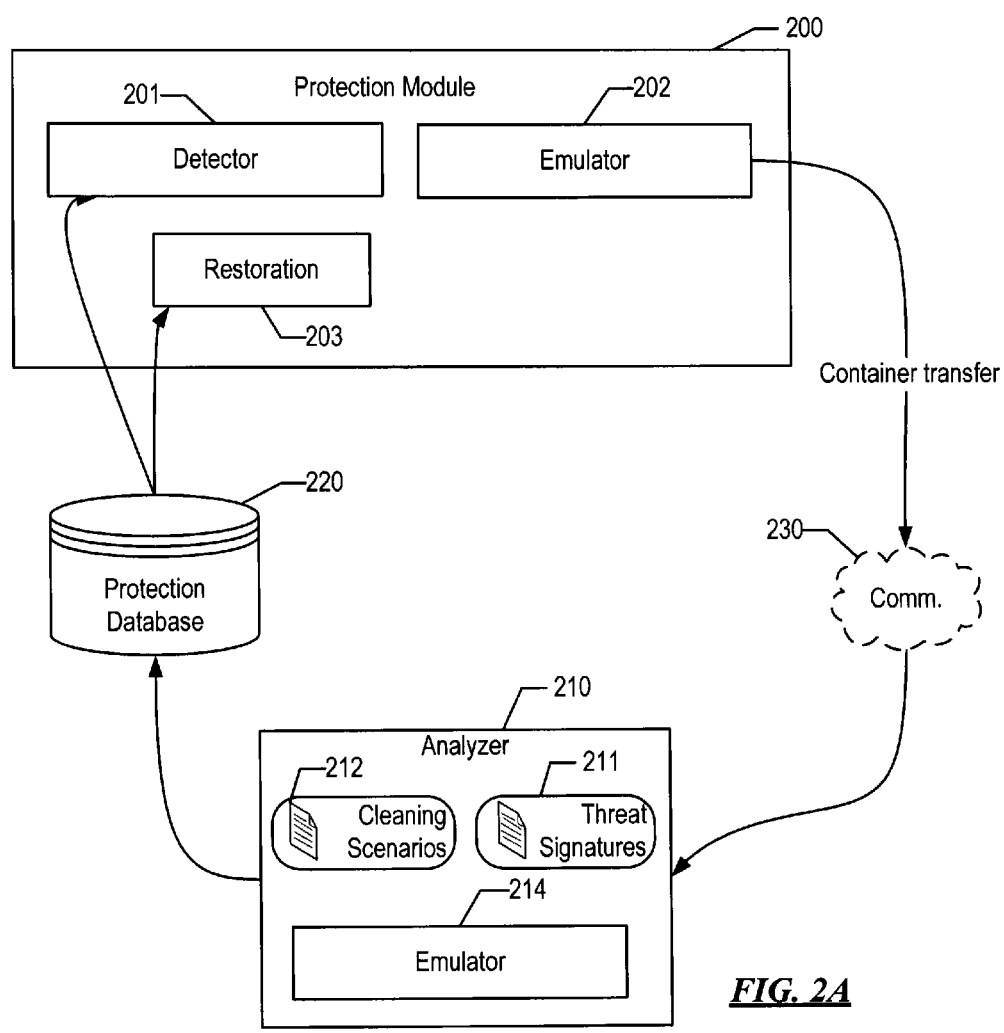
FIG. 2A is a diagram illustrating a system for countering bootkit malware according to one embodiment of the present invention.

It is generally understood that, in order to effectively combat a bootkit, one must analyze the bootkit's originated data, including the modified MBR. However, it is almost impossible to gather these files by scanning disks, files, or through the use of behavior analyzers because of the malware's operation characteristics and its ability to obfuscate itself. This kind of threat has to be identified at the moment of infection. One aspect of the invention allows detecting, blocking and curing an infected computer of harmful boot programs. FIG. 2A is a diagram illustrating a system for countering bootkit malware according to one embodiment.

In one example embodiment, an anti-bootkit protection system comprises protection module 200, at least a part of which may resides and executes locally on the computer system being protected. The protection system further includes analyzer module 210 and protection database 220. These modules can be locally implemented on the computer system in one type of embodiment. In another type of embodiment, one or more of analyzer module 210 and protection database 220 are implemented remotely from the computer system being protected, such as on one or more servers operated by a protection service provider. In this latter type of embodiment, a communication mechanism 230 facilitates interaction between the client-side modules and the server-side modules. In one exemplary type of configuration, any components of the protection system that reside locally on the computer system being protected are licensed to the user of the computer system by the protection service provider.

The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

Detector module 201 is configured with signature information for a number of known bootkits. In operation, detector module 201 obtains data that is written in the MBR and other critical parts of the boot device, and compares that data against the signatures of known bootkits.

Emulator module 202 implements a technique of emulation of the computer system's boot process, which permits identifying the disk sectors containing elements of a hidden piece of malware. This exemplary arrangement allows finding new, unknown, threats that infect the MBR, without relying solely on signature scanning by detection module 201. Still, the analysis by signature scanning can be useful in this context for detection of a dropper, i.e., a program which infects the disk. Subsequently, it will be possible to detect a bootkit on the disk by its "footprint" (signature), by booting the computer from an external drive and by scanning the infected physical disk, or by performing a check based on the generated signatures, calling for the disk through anti-rootkit tools.

A more detailed analysis of the malware is performed in order to:
separate the addresses of the harmful resources causing the infection from the program body;
generate signatures of the bootkit files 211, disk sectors and other data, for subsequent signature check and infection prevention;
separate the original MBR and its decoding method in order to clean out the malware from the computer.

Emulator module 202 obtains an accurate image of boot-related portions of hard drive 111, utilizing a specialized rootkit-bypassing driver to obtain reliable information, as described in greater detail below.

Figure 2B:
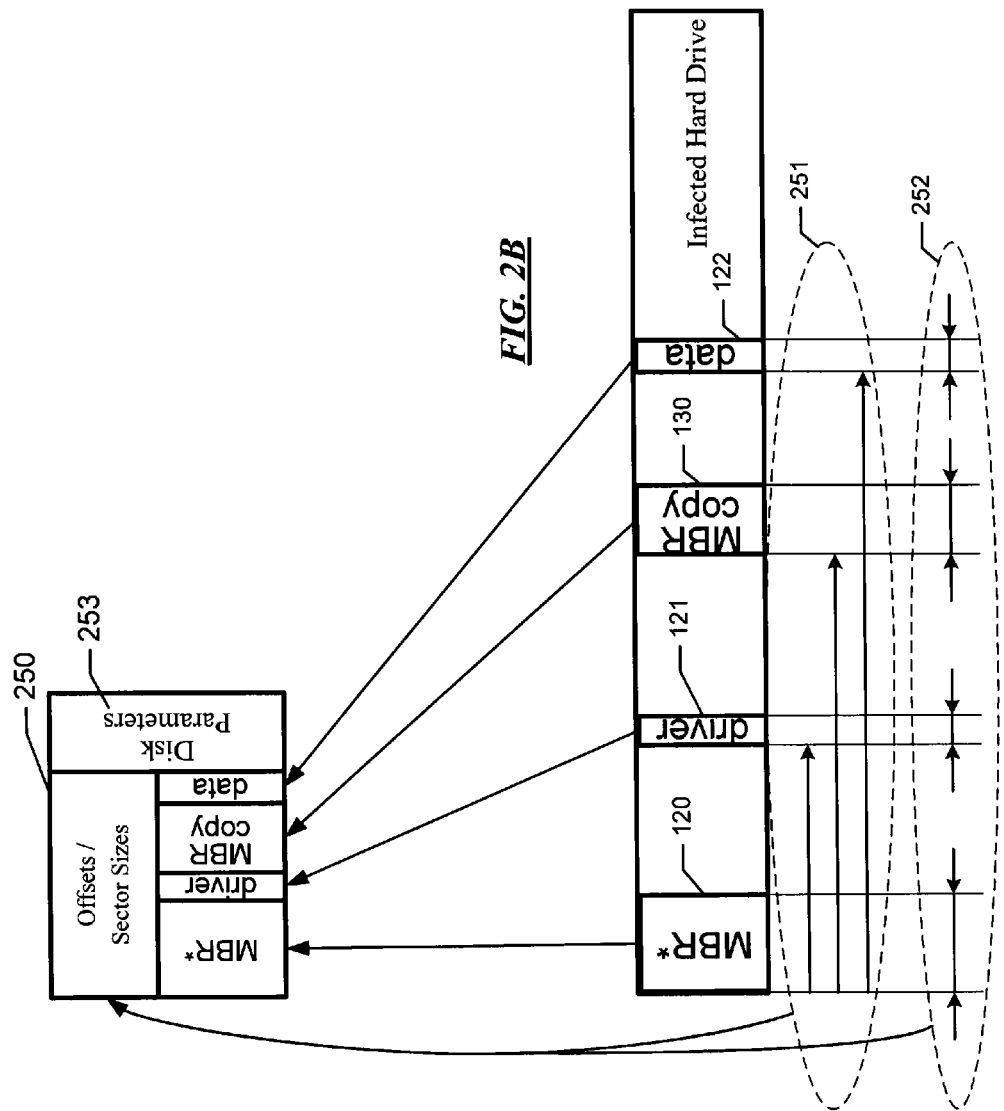
FIG. 2B is a diagram illustrating a container data structure for storing and transmitting key information for identifying and emulating operation of a bootkit.

In one embodiment, a container 250 data structure is used to transfer key information about the boot device being investigated to the analyzer. One example of a container 250 is illustrated in FIG. 2B. The container 250 includes all hard drive sectors which store bootkit data 120-122. For example, the following disk sectors can be stored: the modified MBR sector 120, the sectors storing the rootkit functionality (i.e., driver) 121, a sector storing a copy of the original MBR 130, which was relocated from the boot sector and possibly encoded, as well as sectors 122 containing code for carrying out the bootkit's harmful payload. The container arrangement of this embodiment is but one example and may contain more or less sectors, depending on the bootkit in question.

Container 250 stores the physical parameters 253 of the hard drive under analysis, and the content of the sectors together with the offset 251 of each sector from the zeroth sector. In one embodiment, physical parameters 253 include data defining a storage arrangement structure of the hard drive under analysis such as the number of cylinders, the number of heads per cylinder, the sector size, etc. As a result, the information maintained in container 250 is sufficient to re-create the bootkit, taking into account its location on the disk. The generated container is subsequently used to analyze the bootkit.

For each sector written into container 250 or for each disk data area composed of sequentially located sectors, the offset against the zero sector 251 and the size 252 are specified. The offset and the size can vary both in the number of sectors and in the quantity of information (in terms of bytes, bits).

The size of container 250 can be limited by the number of sectors, memory size or other parameters. In one example embodiment, for optimal handling of container 250 and in order to send container 250 through the network without unduly burdening the system or network, the container size may be kept below about 1 MB.

In one embodiment, container 250 is transmitted for analysis to a protection service provider. Various data transfer methods are contemplated. In one such data transfer provision, communication mechanism 230 is utilized for gathering data from client computers in order to analyze threats. One example of communication mechanism 230 is described in U.S. Pat. No. 7,743,419, incorporated by reference herein.

The container 250 is examined by analyzer 210, which can reside on the computer system being protected in various forms, or remotely from that computer system, e.g., on a server at the protection service provider. In one type of embodiment, where analyzer 210 is situated remotely from the computer system being protected, analyzer 210 includes its own local emulator module 214. In another type of embodiment where analyzer 210 is situated remotely from the computer system being protected, analyzer 210 utilizes emulator module 202, or a different emulator module (not shown), which may reside on a separate server or in a cloud computing model. In this latter embodiment, analyzer 210 passes container 250 to the emulator module to be used.

Having received a container 250 for analysis, the emulator 202, 214 loads the disk image information in such a manner that the infected sectors 120, 121, 122 are arranged in accordance with the offsets 251 specified in container 250. In this approach, analyzer module 210 virtually recreates the examined boot device's physical state in a virtual space on a virtual disk. This facilitates emulation of the system's boot process. The virtual disk in the emulation re-creates the physical characteristics of the hard drive based on the physical parameters 253 stored as part of container 250.

During the boot emulation, all actions of the bootkit are tracked, including disk reading and writing commands, calls to memory, and other actions related to the computer system's components. In one embodiment, analyzer module 210 is configured to search for, and find a copy of the original MBR 130, which may be encoded or packed.

In a related embodiment, analyzer module 210 is configured to analyze the functionality (i.e., behavior) of program instructions executed during start-up to detect the presence of any malware. In the case where the bootkit's functionality involves, for example, transfer or loading of data or execution of remote commands from a specified external address, analysis of the bootkit yields identification of the address of the resource representing a threat.

As a result of the operation of analyzer module 210, anti-virus databases 220 are updated with signatures of the detected threats 211, harmful component files, and computer cleaning scenarios 212. Once the databases are updated, the new records are used by restoration module 203 to clean the computer and by the detection module 201 to prevent new infections of the computer. The cleaning of the computer is done by re-writing of the computer's MBR 120 using the original version 130 identified during the analysis of the bootkit or saved in a backup copy, and by removing the bootkit components from the hard drive. In this case, the sectors which were modified by the malware at the moment of infection can be restored from the backup copy.

Figure 3B:
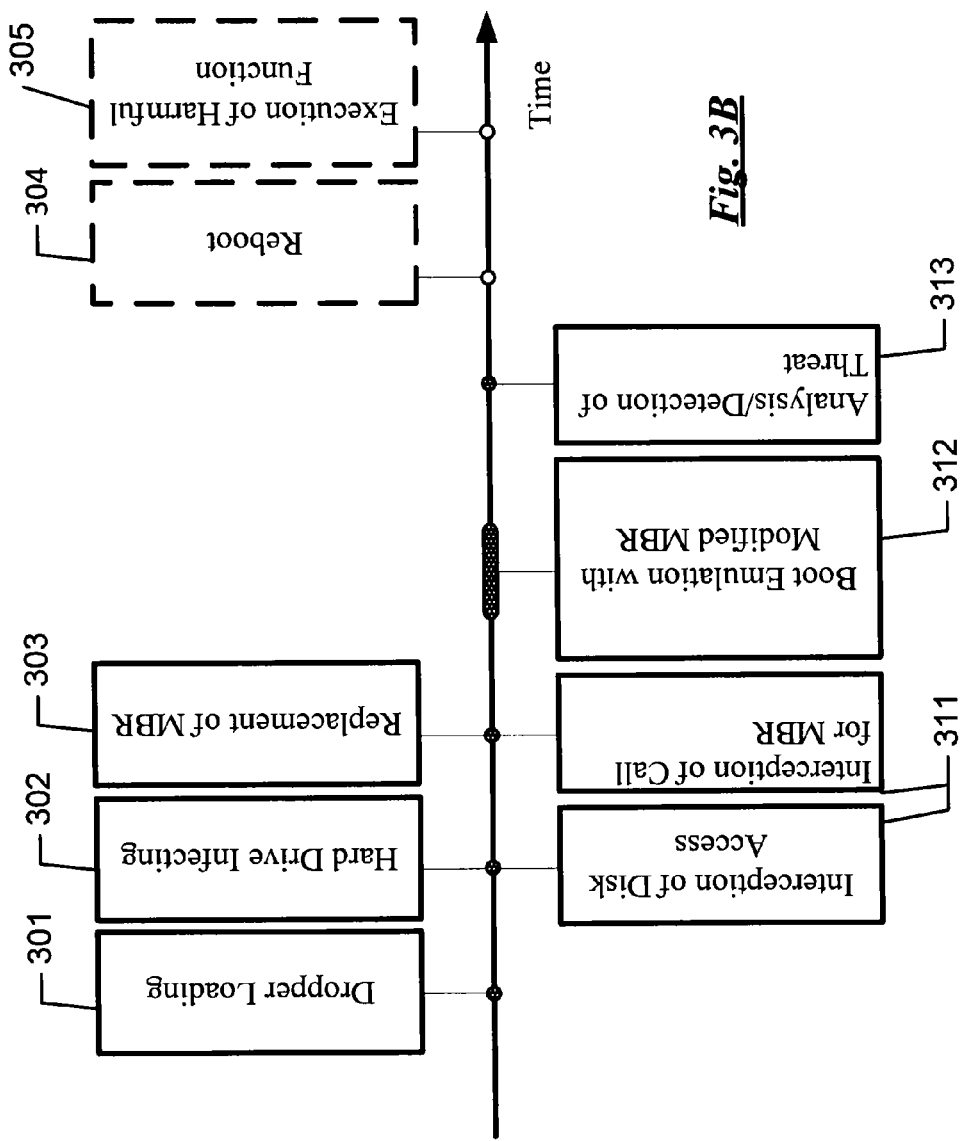

FIGS. 3A and 3B are flow diagrams that include a time axis illustrating examples of functionality of a program for cleaning an infected disk and to block disk infections through the use of a boot emulation technique. The time axis is marked with indicators corresponding to specific events. Indicators placed above the time axis correspond to events relating to the malware's functionality; whereas those below the axis correspond to protection-related events.

The series of the events illustrated in FIG. 3A describes a case where a bootkit has infected a computer and is present in the system. In order to effectively counter the threats, this first approach uses anti-virus functionality outside the process emulator and signature check. In this embodiment, quarantine modules create backup copies of suspicious files. Cloud services collect user infection statistics. System logs record the executed processor commands and the memory operation commands, conduct of computer flows and processes, calls of API functions, writing and reading of files, connections at network and application levels, etc. Notably, this stage is executed even before the threat appears on the computer; it starts monitoring system objects and operations performed with those objects, as well as the keeping of logs 300, which allow the system to subsequently detect the links between processes, objects, physical memory, computer users and external resources.

Maintaining this kind of information allows the protection system to determine the circumstances of the infection based on current states of the computer system. For example, if information related to harmful objects is found on a hard drive, it will be possible to determine (using the system log) the process which was the last to call for the sectors of the specified disk, in order to identify the relevant executable file. If the infection occurred using an exploit (a code which takes advantage of vulnerabilities in applications or devices), then the resource's URL or the file which contain the exploit are identified.

In a further example, consider the case where a computer system is infected by placing a dropper 301 into the computer system. Once a dropper 301 is uploaded to the computer or launched from external media, all its actions are recorded in the system log: the access to the disk will be intercepted and the MBR will be called for during the installation 302 of the bootkit to the hard drive and the replacement of the MBR 303. Let's assume that the malware was able to bypass the security tools and to cause the infection at 302. After the implementation of the rootkit component, the harmful functionality starts to be executed at 305 and can also continue to function after the computer system's restart at 304.

An emulation of the computer's boot process is launched at 306. In various embodiments, the boot emulation starts at different times: e.g., at the user's request, periodically (after a specified time period), in response to an event or by an established task plan (at specified moments in time). During emulation, suspicious components are collected into container 250, which is followed by a bootkit analysis 307 using known methods of malware analysis and bootkit identification. If the presence of a bootkit is identified, the process proceeds to clean the computer system at 308, by removing the bootkit and restoring the boot process, while new signatures of the threat are sent to other users through a protection service, directly or by updating anti-malware databases.

FIG. 3B diagrams another process flow according to a related embodiment, which proactively protects a computer system against bootkits using a boot emulator such as emulator 202 or emulator 214. In this case, infection of the computer is prevented. The sequence of the harmful actions is the same as before for FIG. 3A—a dropper, having launched itself or having seized control on the victim's computer 301, sends commands to write data to disk, such as a command to write to the boot sector 302. These operations with the disk are constantly monitored and, upon their occurrence, intercepted at 311 by the protection module; the malware's activity is suspended; then, the emulator is launched at 312, whose input receives a replacement MBR and the data attempted to be written to the disk, taking into account the location of the data. In other words, a container 250 is generated from the intercepted disk write commands and is sent for emulation. This is followed by an emulation of the boot of a virtual disk containing the specified changes, and in case of detection of a threat 313, the anti-virus tool blocks the malware and removes it from the system. In addition, the malware (or a signature of the malware) is sent to the protection services provider for enhancing the knowledge base of known threats or for additional analysis. The signature can be generated either on the service provider's side, or in the protected computer system. This process prevents the execution of the bootkit's ultimate functions 305.

The boot process emulator module can, in various embodiments, be hardware-based (in the form of a microchip), software-based (in the form of an application, service, or driver executed on a processor), or firmware-based (e.g., in the form of a microchip with program code).

Figure 4:
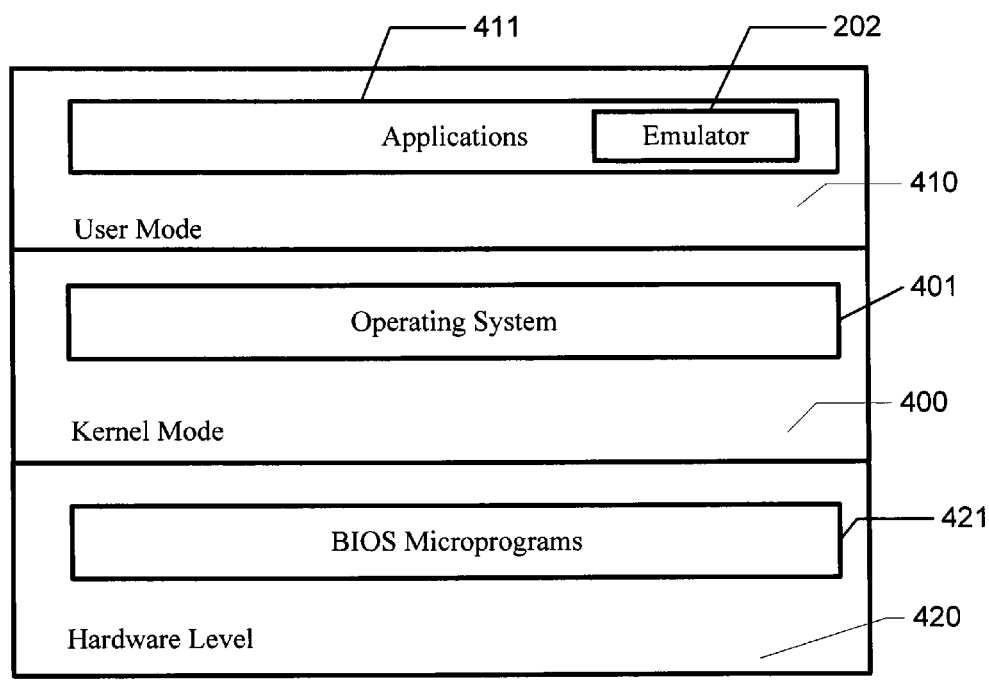
FIG. 4 illustrates a multi-level secure computer system model in which aspects of the invention may be applied according to various embodiments.

In one embodiment, the emulator is operated at the application level. The architecture of the computer system is a multi-level model as illustrated in FIG. 4. The memory is partitioned by security modes, separating system services of the operating system 401 executed in kernel mode 400, user applications 411 executed in user mode 410, and microprograms 421 stored in hardware 420. The number of security levels can vary. For instance, OSs of the Windows family use a two-level protection model. An example of a microprogram in a computer system is the BIOS (Basic Input/Output System), which defines the logic of the interaction between the drivers of the operating system 401 and the computer system's hardware level 420 and directly participates in the computer system boot process.

To facilitate the understanding of how this model functions, let's consider an example of how the application works with a disk. The process of the application's work with the disk in the includes the following stages: during the execution of the application, the process flow produces a command to read/write/create/remove a file on one of the disks. This request is addressed to the relevant driver of the file system (FAT, NTFS, etc.), which in turn determines the clusters where the file is read or written. Subsequently, the file system driver calls for the hardware driver of the hard drive itself, which executes the command to work with the disk using a specified protocol through the hard drive controller. In this case, the application is executed in the user mode 410, the drivers are at the kernel level 400 (kernel mode or Ring0), while the hardware level 420 is represented by the hard drive controller. In order for the application to be able to perform an operation with the disk bypassing the operating system 401, it needs to obtain privileges at the root level, or to make a call to a driver implemented in the kernel mode 400.

Figure 5:
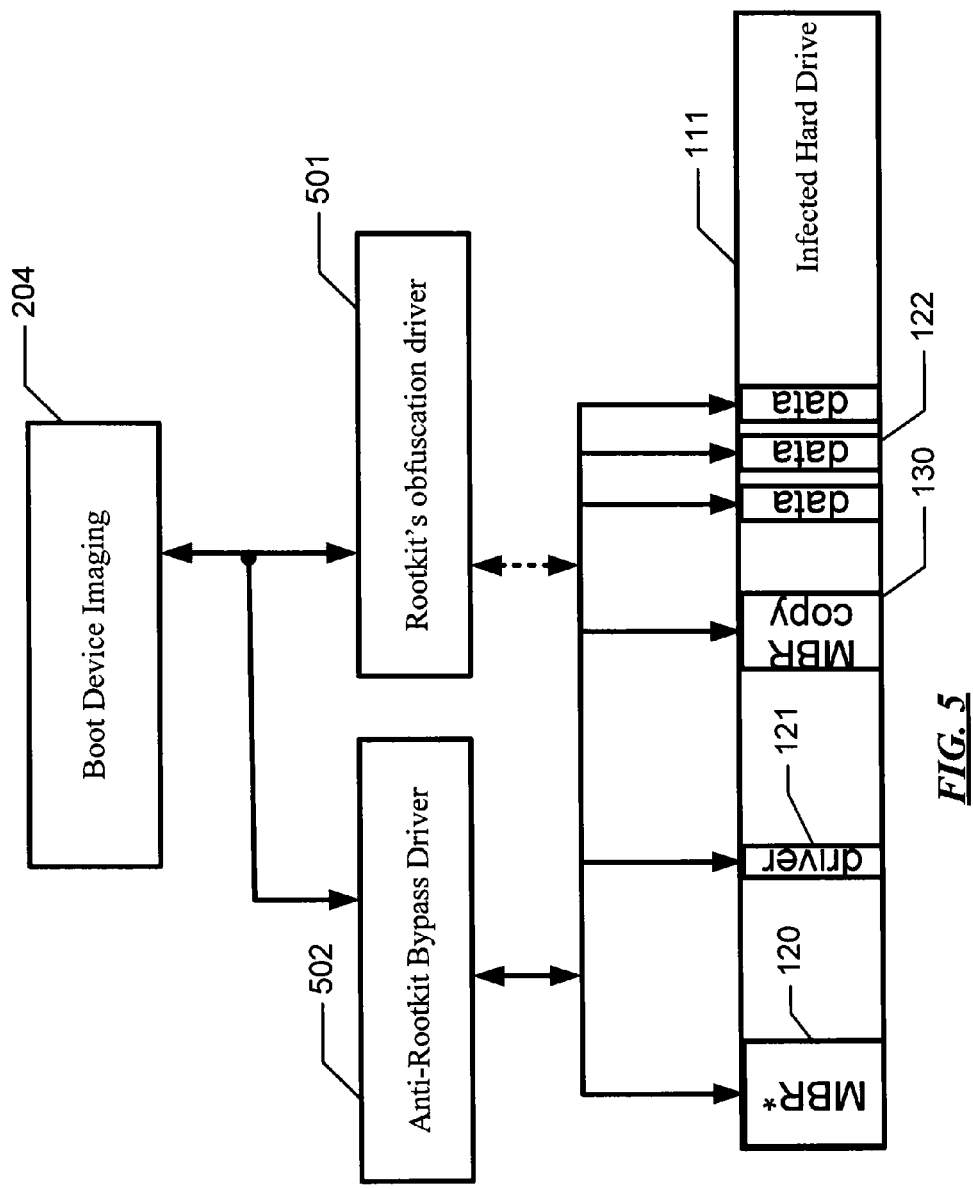
FIG. 5 illustrates an example process in which a rootkit is installed and combated on a computer system according to one embodiment.

FIG. 5 illustrates an example process in which a rootkit 501 is installed and combated on the computer system according to one embodiment. The rootkit intercepts the file operations to the disk 111 and either blocks them or returns false data. When emulator module 202 of protection module 200, operating at the application level, scans disk 111 or the files stored thereon, or when protection module 200 needs to create a disk image for emulation or for data backup, it will not be able to obtain accurate information and ensure reliability of the information when rootkit driver 501 is in operation.

In one embodiment, as shown in FIG. 5, boot device imaging module 204 obtains access to the disk or files using an anti-rootkit bypass driver 502, ensuring accessibility and integrity of the information being processed; otherwise it would be intercepted and replaced with false data by the rootkit. In one embodiment, bypass driver 502 is a kernel-level driver that provides access to the critical sectors of the boot device (e.g., hard drive), and is distinct from the file system or disk access driver of the operating system that ordinarily performs the same function. In a related embodiment, bypass driver 502 has features that provide increased immunity from rootkit attack compared to the default operating system driver.

Bootkits contain a rootkit-like functionality for concealing data in the system. Launching itself after the system is restarted, the bootkit driver (represented in FIG. 5 as rootkit's obfuscation driver 501) intercepts the calls for the disk where its data is located, including the calls for the boot sector 120, and returns a purposefully false value (e.g., a blank value, a random value, replaces the called sector with another one, etc.). If the operating system responds to a call for the boot sector by returning the current MBR, which is modified for bootkit loading purposes, the rootkit obfuscation driver returns a copy of the original unchanged MBR 130 that it had stored in a different area of the disk.

Figure 6:
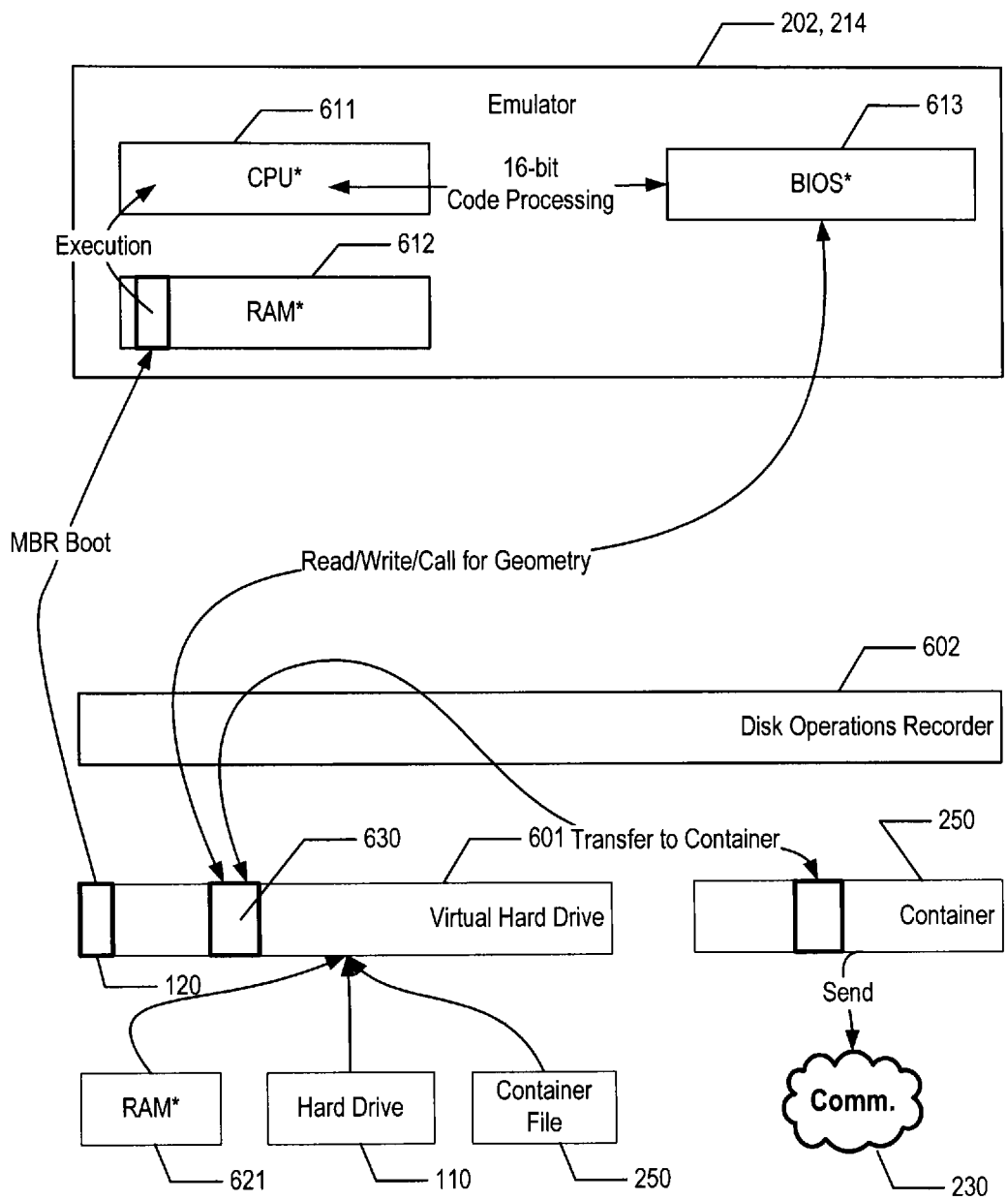
FIG. 6 is a functional block diagram illustrating a system for detecting unknown programs such as bootkits during the boot process according to one embodiment.

FIG. 6 is a functional block diagram illustrating a system for detecting unknown programs such as bootkits during the boot process according to one embodiment. The system includes emulator module 202, 214, a virtual hard drive module 601 and a disk operations recorder module 602. In order to reproduce the boot process, the actual processor, memory, and BIOS are emulated, respectively, as processor 611*, RAM* 612 and BIOS* 613.

The virtual hard drive 601 is an abstract representation of the physical device. If a hard drive 110 is supplied to the emulator's input, then the virtual disk mimics the hard drive's geometry (has identical sector sizes, volume, number of cylinders and heads). A virtual representation of a disk is used in order to isolate the emulator and all instructions being executed in it from an actual system, including actual data of the hard drive 110.

In one embodiment, the process of reading from the hard drive 110 is as follows: first, a request is sent to the virtual disk 601. In response to the request, virtual disk 601 requests data from the actual hard drive 110, the results of which are returned to the process being emulated. Depending on the infected/non-infected condition of the actual disk, emulator 202, 214 may leave requests unanswered or provide knowingly false data. For example, the process of writing to disk will not be performed on the actual disk 110, but limited to writing to a virtual hard drive 601. A similar interaction between the emulator and the real environment is created in a virtual random access memory: a call for an actual RAM 621 goes through an abstract representation, where it is filtered, redirected, blocked or simulated (e.g., an artificial value is substituted in place of the requested value).

The process of emulating the boot of an actual device according to one embodiment is described below. The detection system receives information about a boot device to be analyzed, which can be hard drive 110, a logical drive, a memory unit 621, a container record 250, etc., in order to emulate a boot from this device. A virtual hard drive 601 is created for this boot device. Subsequently, the boot record 120 is copied to the virtual random access memory (RAM*) 612, from where it begins to execute on the processor of the virtual CPU* 611. The executable 16-bit boot code is processed by the virtual BIOS* 613. During the boot emulation, additional sectors 630 are loaded from the disk. All calls for the disk are logged in the disk operations recorder module 602. The emulation process can be limited by the number of commands, processor cycles, by the time period or by another parameter. The boot process continues until the operating system is loaded and control is transferred to it. The emulation process can be stopped together with the end of the loading or continued to track the harmful functionality; this would require emulation of the operating system's services and drivers as well, which could exert a significant load on the actual emulation system. This issue can be solved by a firmware (software & hardware) emulator arrangement, which would transfer the emulator's calculations from the actual computer system to a separate device.

Container 250 receives the records of disk sectors 630 requested during the computer system's boot-up. Upon completion of the boot emulation, the read and recorded sectors are collected from the virtual disk to container 250, which is sent to a protection service provider using communication mechanism 230 such as, for example, KSN Tools™ by Kaspersky Lab. As discussed above, the example of container 250 may be used for storage and transfer of a bootkit. This container format is designed so as to provide an opportunity to perform a reverse action of mounting the container 250 into the virtual hard drive 601. In this embodiment, the container 250 can be used as an input to a malware detection system, which allows it to emulate the boot again or to emulate the boot of another computer system.

Figure 7:
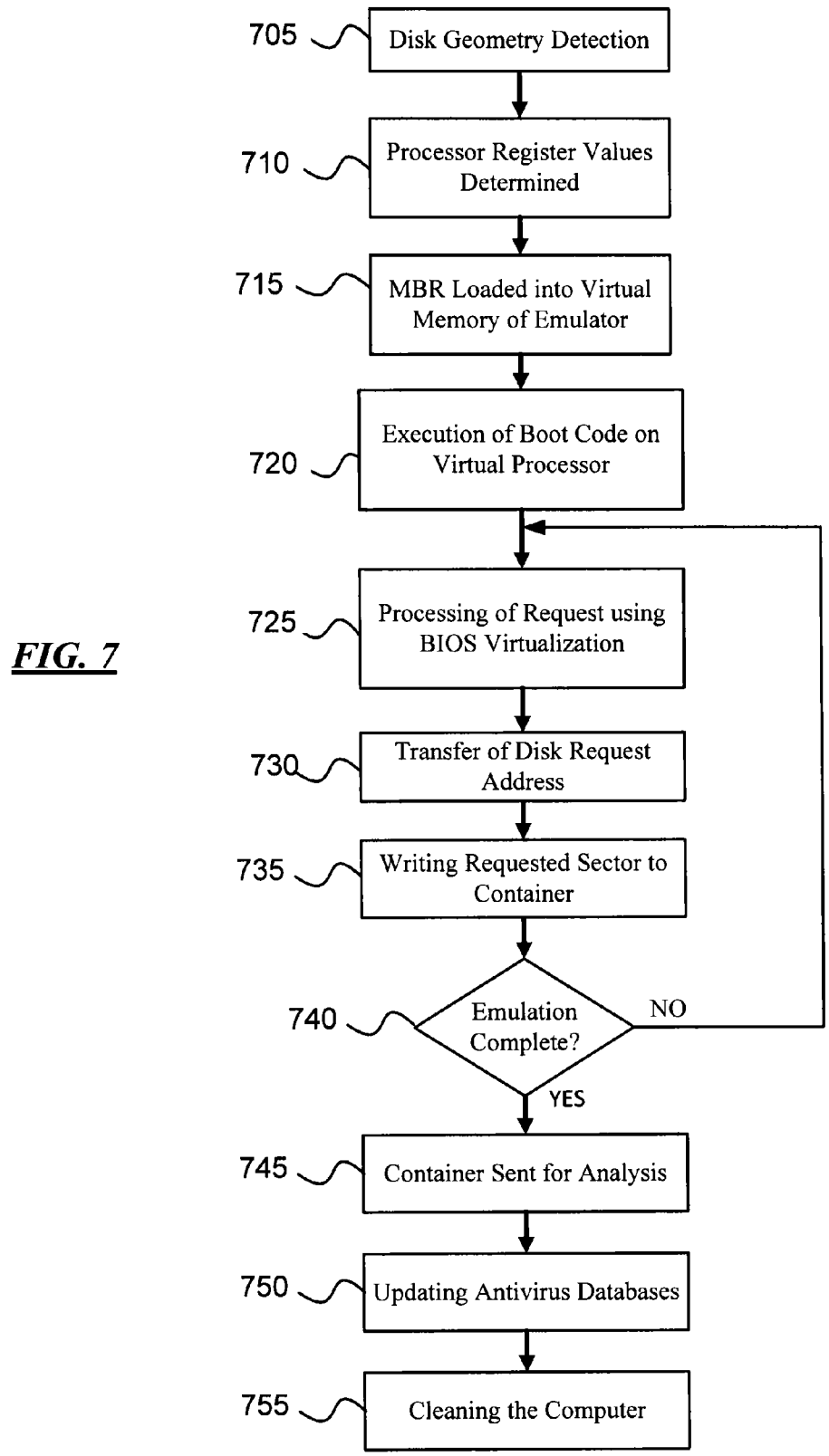
FIG. 7 is a diagram illustrating a process of a computer system boot emulation in order to detect unknown programs and data according to one embodiment.

FIG. 7 is a diagram illustrating a process of a computer system boot emulation in order to detect unknown programs and data according to one embodiment. Upon initiation of the boot emulation, the physical parameters, i.e., disk geometry, are determined at 705. This information may be read from container 250 or determined from the hard drive parameters available elsewhere. At 710, processor register values are determined. At 715, the MBR is loaded into the virtual memory of the emulator module.

At 720, the boot record code begins to execute on the virtual processor. The requests are processed using BIOS virtualization at 725, which sends the address for direct access to the disk at 730. All sectors requested during emulation and whose addresses are received at 730 are recorded in the container at 735.

The boot emulation can be stopped depending on the design and settings, for various reasons including: when the maximum number of emulated commands is reached, when the maximum container size is reached, etc. Blocks 725, 730, and 735 are repeated until the emulation process over, as determined at decision 740. Once the container is generated, it is sent for analysis at 745 to a protection service provider, to a dedicated server, to another computer or to an analysis tool installed on the computer system being studied. The analysis results in an update of anti-virus databases at 750 and in cleaning the computer system at 755 of the detected and analyzed threat.

In a practical realization, the system and method of the invention are implemented, and carried out, respectively, using computer machinery. The computer-implemented system can be implemented in one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

Figure 8:
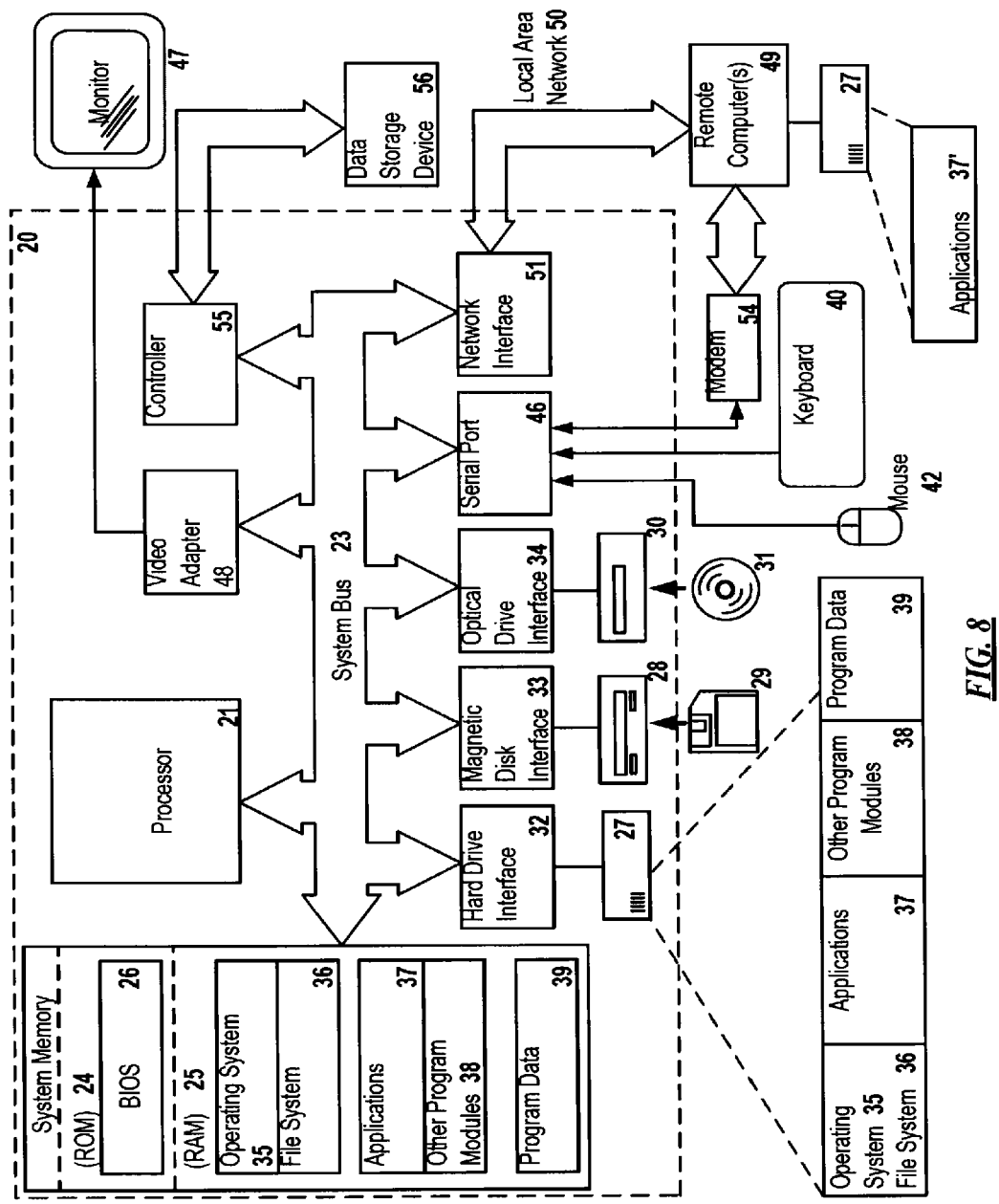
FIG. 8 is a block diagram illustrating an exemplary general-purpose computer system on which one or more functional modules of the system can be implemented.

FIG. 8 is a block diagram illustrating an exemplary general-purpose computer system on which one or more functional modules of the system can be implemented. Personal computer or server 20 contains a CPU 21, system memory 22 and system bus 23, which contains various system components, including memory associated with CPU 21. The system bus 23 is implemented as any known in bus structure, including a bus memory, bus memory controller, peripheral bus and local bus, which can interact with any other bus architecture. System memory includes read only memory (ROM) 24, and random access memory (RAM) 25. Basic input/output system (BIOS), containing the main procedures that ensure the transfer of information between the elements of the personal computer 20, for example, at boot time using the ROM 24.

The personal computer 20 contains a hard drive 27 for reading and writing, magnetic disk drive 28 for reading and writing to removable magnetic disk 29 and an optical drive 30 for reading and writing to removable optical disk 31, such as CD-ROM, DVD-ROM or other optical media. The hard disk drive 27, magnetic disk drive 28, optical drive 30 are all connected to the system bus 23 via the hard disk interface 32, magnetic disk drive interface 33 and an optical drive interface 34, respectively. Drives and the corresponding computer storage media are non-volatile storage means of computer instructions, data structures, program modules and other data of a personal computer 20. This description reveals the implementation of a system, which uses a hard disk, removable magnetic disk 29 and a removable optical disk 31, but it should be understood that the use of other types of computer storage media that can store data in computer readable form (solid state disks, cassette tape, flash drive or other nonvolatile memory, digital disks, Bernoulli cartridges, random-access memory (RAM), read-only memories (ROM), etc.) is possible.

Some of the software modules, amongst which may be an operating system 35, are stored on a hard disk, magnetic disk 29, optical disk 31, ROM 24 or RAM 25. A computer 20 has a file system 36, which stores the operating system 35 and additional software applications 37, other program modules 38 and program data 39. The user has the ability to enter commands and information into a personal computer 20 through input devices (keyboard 40, Mouse 42). Other input devices may be (not shown): microphone, joystick, game console, satellite dish, scanner, etc. Such an input device are usually connected to the CPU 21 through a serial port 46, which in turn is connected to the system bus, but may be connected by other means, such as a parallel port, game port or universal serial bus (USB). A monitor 47 or other type of display device is also connected to the system bus 23 via an interface such as a video adapter 48. In addition to the monitor 47, personal computer can be equipped with other peripheral output devices (not shown), such as speakers and printer, etc.

Personal computer 20 generally operates in a networked environment, using a logical connection to one or more remote computers 49. A remote computer (or computers) 49 can take the form of one or more personal computers, servers, routers, network stations, peering devices or another network host, and usually, have most or all of the elements previously described in the description of the substance of a personal computer 20. Logical connections include a network interface 51 to a LAN 50 or wide area network (WAN).

When using LAN networks, a personal computer 20 is connected to LAN 50 via a network adapter or interface 51. When using the WAN networking, personal computer 20 has a modem 54 or other means of communication with the global computer network, such as the Internet. A modem 54, which may be internal or external, is connected to the system bus 23 via a serial port 46. In a networked environment software modules of exposed personal computers 20, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a micro controller digital signal processor, application-specific integrated circuit, field programmable gate array, or the like, provided that the system includes sufficient input/output facilities to enable it to interface with a subject computer system being managed or with other computing devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated computer-implemented method for investigating a presence of an unknown program on a target computer system that includes a processor, memory, and a basic input/output system (BIOS), and that further includes a bootable device that contains boot code at least partially defining a boot process for the target computer system, the method comprising:
   obtaining, by an automated protection system, physical parameter data defining a storage arrangement structure of the bootable device;
   emulating, by the automated protection system, the boot process of the target computer system based on the physical parameter data, wherein the emulating is carried out in a virtual environment representing the target computer system, and includes executing the boot code and obtaining boot process information in response to executing of the boot code;
   generating, by the automated protection system, a data structure representing at least the boot process information; and
   based on the data structure, obtaining a determination of whether the boot process information includes an unknown program.

2. The method of claim 1, wherein obtaining the boot process information includes obtaining a master boot record (MBR) of the bootable device.

3. The method of claim 1, wherein obtaining the boot process information includes obtaining program code called by a master boot record (MBR) of the bootable device.

4. The method of claim 1, wherein obtaining the boot process information includes operating a rootkit-bypassing driver on the target computer system.

5. The method of claim 1, wherein emulating the boot process is performed at an application layer on the target computer system.

6. The method of claim 1, wherein emulating the boot process includes operating a virtual processor, a virtual memory, a virtual basic input-output system (BIOS) and a virtual startup device that represents the storage arrangement structure of the bootable device.

7. The method of claim 1, wherein generating the data structure includes storing a container data structure including a first portion for storing a representation of the storage arrangement structure of the bootable device, and a second portion for storing contents of a plurality of sectors of the bootable device, the first portion and second portion being sufficiently complete to facilitate emulation of the boot process of the target computer system on a remotely located computer system.

8. The method of claim 1, further comprising:
   transmitting the data structure to a remotely located computer system.

9. The method of claim 1, further comprising:
   intercepting a command to write data to a start-up related section of the bootable device;
   initiating the emulating in response to the intercepting; and
   in response to a determination that the boot process information includes an unknown program, preventing execution of the command to write data to the start-up related section of the bootable device.

10. The method of claim 1, wherein the determination of whether the boot process information includes an unknown program is generated by the automated protection system.

11. The method of claim 1, wherein the determination of whether the boot process information includes an unknown program is obtained from a remotely located computer system.

12. An automated computer-implemented method for detecting an unknown program on a target computer system having a bootable device, the method comprising:
   receiving, by an automated analysis system remotely located from the target computer system, a data structure containing:
      boot process information stored on the bootable device that at least partially defines a boot process of the target computer system; and
      physical parameter data defining a storage arrangement structure of the bootable device;
   analyzing, by the automated analysis system, whether the bootable device contains a suspicious program accessed by the boot process of the target computer system, the analyzing including emulating the boot process of the target computer system based on the data structure, wherein the emulating includes executing code of the boot process information in a virtualized computer system representing physical characteristics of the target computer system, and evaluating a result of the executing of that code.

13. The method of claim 12, wherein the analyzing includes finding a copy of an original master boot record (MBR) of the bootable device along with a modified MBR.

14. The method of claim 12, wherein evaluating the result of the executing of the code of the boot process includes observing functionality of programs called in the emulation to detect a presence of malware.

15. The method of claim 12, further comprising:
   updating a database of malware signatures based on the analyzing.

16. A protection system for detecting an unknown program on a target computer system having a bootable device, protection system comprising:
   a boot emulator module configured to:
      collect boot process information stored on the bootable device that at least partially defines a boot process of the target computer system and physical parameter data defining a storage arrangement structure of the bootable device; and
      perform an emulation of the boot process of the target computer system based on the boot process information and on the physical parameter data;
      wherein the boot emulator module is further configured to execute instructions of the boot process information and track data accessed from the bootable device in response to the instructions of the boot process information; and
   a detector module communicatively coupled with the boot emulator module, and configured to detect a presence of unknown programs based on the data accessed from the bootable device in the emulation of the boot process.

17. The protection system of claim 16, wherein the boot emulator module is further configured to store the data accessed from the bootable device in a container data structure.

18. The protection system of claim 17, wherein the data accessed from the bootable device includes data purporting to be a master boot record (MBR) and bootkit infection data, including unauthorized instructions.

19. The protection system of claim 17, wherein the data accessed from the bootable device includes data representing contents of an original master boot record (MBR) of the bootable device prior to malware infection of the bootable device.

20. The protection system of claim 17, wherein the container data structure further stores a representation of the storage arrangement structure of the bootable device.

21. The protection system of claim 16, wherein the detector module is configured to search for a copy of an original master boot record (MBR) of the bootable device at a location other than a location of an actual MBR.

22. The protection system of claim 16, wherein the detector module is located remotely from the target computer system.

23. The protection system of claim 16, wherein the detector module is implemented in the target computer system.

24. The protection system of claim 16, wherein the detector module is configured to analyze functionality of programs called during operation of the boot emulator module to detect a presence of malware.

25. The protection system of claim 16, wherein the boot emulator module includes a plurality of virtual modules implemented at an application layer comprising:

- a virtual bootable device module adapted to represent physical and logical states of the actual bootable device including a master boot record and any malware infection of the actual bootable device;
- a virtual processor module operatively coupled with the virtual bootable device module, the virtual processor module adapted to execute the instructions of the boot process information that include the master boot record of the virtual bootable device;
- a virtual memory module operatively coupled with the virtual processor module and adapted to emulate functionality of physical memory of the target computer system; and
- a virtual basic input-output system (BIOS) module operatively coupled with the virtual processor module and adapted to emulate functionality of actual BIOS of the target computer system; and
- wherein the protection system further comprises a disk operations recorder module configured to record all calls made to the bootable device during operation of the boot emulator module.

* * * * *